United States Patent  
Izuha

(10) Patent No.: US 8,135,573 B2
(45) Date of Patent: Mar. 13, 2012

(54) APPARATUS, METHOD, AND COMPUTER PROGRAM PRODUCT FOR CREATING DATA FOR LEARNING WORD TRANSLATION

(75) Inventor: Tatsuya Izuha, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1030 days.

(21) Appl. No.: 12/050,643

(22) Filed: Mar. 18, 2008

(65) Prior Publication Data

US 2009/0063127 A1 Mar. 5, 2009

(30) Foreign Application Priority Data

Sep. 3, 2007 (JP) ................................. 2007-228051

(51) Int. Cl.
 *G06F 17/20* (2006.01)
(52) U.S. Cl. .......................... 704/2; 704/4; 704/5; 704/7
(58) Field of Classification Search .................... 704/2–8
 See application file for complete search history.

(56) References Cited

U.S. PATENT DOCUMENTS

| 4,829,580 | A * | 5/1989 | Church ........................ 704/260 |
| 7,233,892 | B2 * | 6/2007 | Brill et al. ........................ 704/9 |
| 7,689,412 | B2 * | 3/2010 | Wu et al. ........................ 704/10 |
| 2002/0188439 | A1 * | 12/2002 | Marcu ............................... 704/5 |
| 2003/0061023 | A1 * | 3/2003 | Menezes et al. .................. 704/4 |
| 2003/0139920 | A1 * | 7/2003 | Abir .................................. 704/2 |
| 2004/0098247 | A1 * | 5/2004 | Moore ............................... 704/4 |
| 2005/0216253 | A1 * | 9/2005 | Brockett ........................... 704/5 |
| 2005/0246158 | A1 * | 11/2005 | Weise ............................... 704/4 |
| 2006/0111892 | A1 * | 5/2006 | Menezes et al. .................. 704/7 |
| 2006/0116867 | A1 * | 6/2006 | Moore ............................... 704/2 |
| 2006/0282255 | A1 * | 12/2006 | Lu et al. ............................ 704/2 |
| 2006/0287847 | A1 * | 12/2006 | Moore ............................... 704/8 |
| 2007/0083357 | A1 * | 4/2007 | Moore et al. ...................... 704/4 |
| 2008/0015842 | A1 * | 1/2008 | Moore ............................... 704/4 |
| 2008/0120092 | A1 * | 5/2008 | Moore et al. ...................... 704/4 |
| 2008/0126074 | A1 * | 5/2008 | Whitelock et al. ................ 704/2 |
| 2008/0306725 | A1 * | 12/2008 | Moore ............................... 704/2 |
| 2009/0083023 | A1 * | 3/2009 | Foster et al. ...................... 704/3 |

FOREIGN PATENT DOCUMENTS

JP 2002-73602 3/2002

* cited by examiner

*Primary Examiner* — Douglas Godbold
(74) *Attorney, Agent, or Firm* — Finnegan, Henderson, Farabow, Garrett & Dunner, L.L.P.

(57) ABSTRACT

An input unit receives an input sentence in a source language. A translation generating unit generates a translation in a target language with respect to a word included in the input sentence and likelihood of the translation in the target language. A correspondence-information creating unit creates correspondence information, in which the word is associated with the translation. A determining unit determines whether the likelihood generated with respect to the translation in the target language included in the correspondence information is larger than a predetermined threshold value. A learning-data creating unit creates learning data in which a word included in the input sentence is associated with the correspondence information including the translation in the target language having the likelihood larger than the threshold value.

8 Claims, 10 Drawing Sheets

FIG.2

| DESCRIPTION | ORIGINAL FORM | PARTS OF SPEECH | TRANSLATION LIST |
|---|---|---|---|
| ⋮ | ⋮ | ⋮ | ⋮ |
| interest | interest | NOUN | 興味;権利;利息 |
| pay | pay | VERB | 払う |
| pays | pay | VERB | 払う |
| paid | pay | VERB | 払う |
| deposit | deposit | NOUN | 預金 |
| bank | bank | NOUN | 銀行;堤防 |
| owe | owe | VERB | 借りがある |
| owes | owe | VERB | 借りがある |
| year | year | NOUN | 年 |
|  | ⋮ | ⋮ | ⋮ |

FIG.3

| WORD ID | DESCRIPTION | ORIGINAL FORM | PARTS OF SPEECH | DEPENDENCY DESTINATION ID | TRANSLATION |
|---|---|---|---|---|---|
| 0 |  | pay | VERB |  |  |
| 1 |  | interest | NOUN | 0 | 利息 |

```
START
   ↓
PERFORM MORPHOLOGICAL ANALYSIS WITH
RESPECT TO INPUT TEXT TO DIVIDE INPUT     ~S601
TEXT INTO WORDS
   ↓
OBTAIN TRANSLATION OF RESPECTIVE          ~S602
WORDS FROM DICTIONARY STORAGE UNIT
   ↓
EXECUTE DEPENDENCY ANALYSIS WITH          ~S603
RESPECT TO WORDS
   ↓
APPLY TRANSLATION RULE TO DETERMINE       ~S604
TRANSLATION
   ↓
END
```

FIG.7

| WORD ID | DESCRIPTION | ORIGINAL FORM | PARTS OF SPEECH | DEPENDENCY DESTINATION | TRANSLATION LIST | RULE APPLICATION |
|---|---|---|---|---|---|---|
| 0 | pay | pay | VERB | | 払う | 0 |
| 1 | deposit | deposit | NOUN | | 預金 | 0 |
| 2 | interest | interest | NOUN | | 興味;権利;利息 | 0 |

| WORD ID | DESCRIPTION | ORIGINAL FORM | PARTS OF SPEECH | DEPENDENCY DESTINATION | TRANSLATION LIST | RULE APPLICATION |
|---|---|---|---|---|---|---|
| 0 | pay | pay | VERB | -1 | 払う | 0 |
| 1 | deposit | deposit | NOUN | 2 | 預金 | 0 |
| 2 | interest | interest | NOUN | 0 | 興味;権利;利息 | 0 |

| WORD ID | DESCRIPTION | ORIGINAL FORM | PARTS OF SPEECH | DEPENDENCY DESTINATION | TRANSLATION LIST | RULE APPLICATION |
|---|---|---|---|---|---|---|
| 0 | pay | pay | VERB | -1 | 払う | 0 |
| 1 | deposit | deposit | NOUN | 2 | 預金 | 0 |
| 2 | interest | interest | NOUN | 0 | 利息 | 1 |

1001

| WORD ID | DESCRIPTION | ORIGINAL FORM | PARTS OF SPEECH | TRANSLATION | LEARNING FLAG |
|---|---|---|---|---|---|
| 0 | pay | pay | VERB | 払う | 0 |
| 1 | deposit | deposit | NOUN | 預金 | 0 |
| 2 | interest | interest | NOUN | 利息 | 1 |

1101 pay deposit <learn tw="利息">interest</learn>

| WORD ID | DESCRIPTION | ORIGINAL FORM | PARTS OF SPEECH | DEPENDENCY DESTINATION | TRANSLATION LIST | RULE APPLICATION |
|---|---|---|---|---|---|---|
| 0 | The | the | ARTICLE | 1 | その | 0 |
| 1 | bank | bank | NOUN | 2 | 銀行;堤防 | 0 |
| 2 | owes | owe | VERB | -1 | 借りがある | 0 |
| 3 | me | me | PRONOUN | 2 | 私 | 0 |
| 4 | 10 | 10 | NUMERAL | 5 | 10 | 0 |
| 5 | years | year | NOUN | 6 | 年 | 0 |
| 6 | of | of | PREPOSITION | 8 | の | 0 |
| 7 | deposit | deposit | NOUN | 8 | 預金 | 0 |
| 8 | interest | interest | NOUN | 2 | 興味;権利;利息 | 0 |
| 9 | . | . | SIGN | 2 | 。 | 0 |

APPARATUS, METHOD, AND COMPUTER PROGRAM PRODUCT FOR CREATING DATA FOR LEARNING WORD TRANSLATION

CROSS-REFERENCE TO RELATED APPLICATIONS

This application is based upon and claims the benefit of priority from the prior Japanese Patent Application No. 2007-228051, filed on Sep. 3, 2007; the entire contents of which are incorporated herein by reference.

BACKGROUND OF THE INVENTION

1. Field of the Invention

The present invention relates to an apparatus, a method, and a computer program product for creating learning data for learning word translation according to a context.

2. Description of the Related Art

A machine translation apparatus that translates an input text in a source language (original text) into a text in a target language different from the source language (translated text) includes a bilingual dictionary in which a plurality of combinations of a word in the source language and a translation in the target language is stored. The bilingual dictionary is generally searched, by using a part or an entire original text as a key, to create a translation to be output based on the searched translation.

Even with the same word in the source language, appropriate translation is sometimes different according to an appeared context. Therefore, in the bilingual dictionary, a plurality of translations in the target language is often registered with respect to one word in the source language. Therefore, it is an important issue to select an appropriate translation according to the appeared context from the translations, to improve translation accuracy by the machine translation apparatus.

As one measure with respect to the issue, there has been a method that an appropriate translation is learnt for each appeared context to select a translation by referring to a learning result. For example, JP-A 2002-73602 (KOKAI) proposes a technique for a translation learning method, in which a user specifies an appropriate translation with respect to a word in an original text, for which an inappropriate translation has been output, referring to the original text and the translation output by a machine translation apparatus.

However, according to the translation learning method described in JP-A 2002-73602 (KOKAI), the user needs to instruct an appropriate translation to the system word by word, and therefore a significant amount of labor is required. That is, in the conventional method, because translation learning data for learning the translation for each appeared context is generally created manually, processing load for generating the learning data becomes excessive.

SUMMARY OF THE INVENTION

According to one aspect of the present invention, a data creating apparatus creates learning data for learning proper usage of a plurality of translation candidates corresponding to one word in a source language, the translation candidates being described in a target language.

The data creating apparatus includes an input unit configured to input a sentence in the source language; a translation generating unit configured to translate one word in the sentence into the target language, and generate a plurality of translation candidates in the target language with respect to the word and likelihood expressing probability of the translation candidate; a correspondence-information creating unit configured to create a plurality of correspondence information in which the word is associated with the translation candidates, respectively; a determining unit configured to determine whether the likelihood of the translation candidate is larger than a predetermined threshold value; and a learning-data creating unit configured to create the learning data in which another word in the sentence is added to the correspondence information of the translation candidate having the likelihood larger than the threshold value.

According to another aspect of the present invention, a data creating method is performed in a data creating apparatus that creates learning data for learning proper usage of a plurality of translation candidates corresponding to one word in a source language, the translation candidates being described in a target language.

The data creating method includes inputting a sentence in the source language; translating one word in the sentence into a target language, and generating a plurality of translation candidates in the target language with respect to the word and likelihood expressing probability of the translation candidate; creating a plurality of pieces of correspondence information in which the word is associated with the translation candidates, respectively; determining whether the likelihood of the translation candidate is larger than a predetermined threshold value; and creating the learning data in which another word in the sentence is added to the correspondence information of the translation candidate having the likelihood larger than the threshold value.

A computer program product according to still another aspect of the present invention causes a computer to perform the method according to the present invention.

BRIEF DESCRIPTION OF THE DRAWINGS

FIG. 2 is a schematic diagram for explaining an example of a data structure of a bilingual dictionary;

FIG. 3 is a schematic diagram for explaining an example of a translation rule;

FIG. 6 is a flowchart of an overall flow of a translation generating process according to the embodiment;

FIG. 7 is a schematic diagram for explaining an example of a processing result of morphological analysis and a translation obtaining process;

FIG. 16 is a schematic diagram for explaining an example of the processing result;

DETAILED DESCRIPTION OF THE INVENTION

Exemplary embodiments of an apparatus, a method, and a computer program product for creating data for learning word translation according to the present invention will be explained below in detail with reference to the accompanying drawings. An embodiment of the present invention is explained by an example in which the invention is realized as a word translation learning apparatus that creates learning data for learning word translation and learns word translation according to the created leaning data to output a learning result. Note that the apparatus of the present invention is not limited to the word translation learning apparatus, and can be any apparatus that creates learning data for learning word translation.

The word translation learning apparatus according to the present embodiment mechanically translates an input sentence (hereinafter, "input text") in a source language, to create word translation learning data including a translation, to which a translation rule is applied at the time of translation, and the input text. Accordingly, in a context in which a word included in the input text appears, adoption of the translation obtained by applying the translation rule can be learnt.

Figure 1:
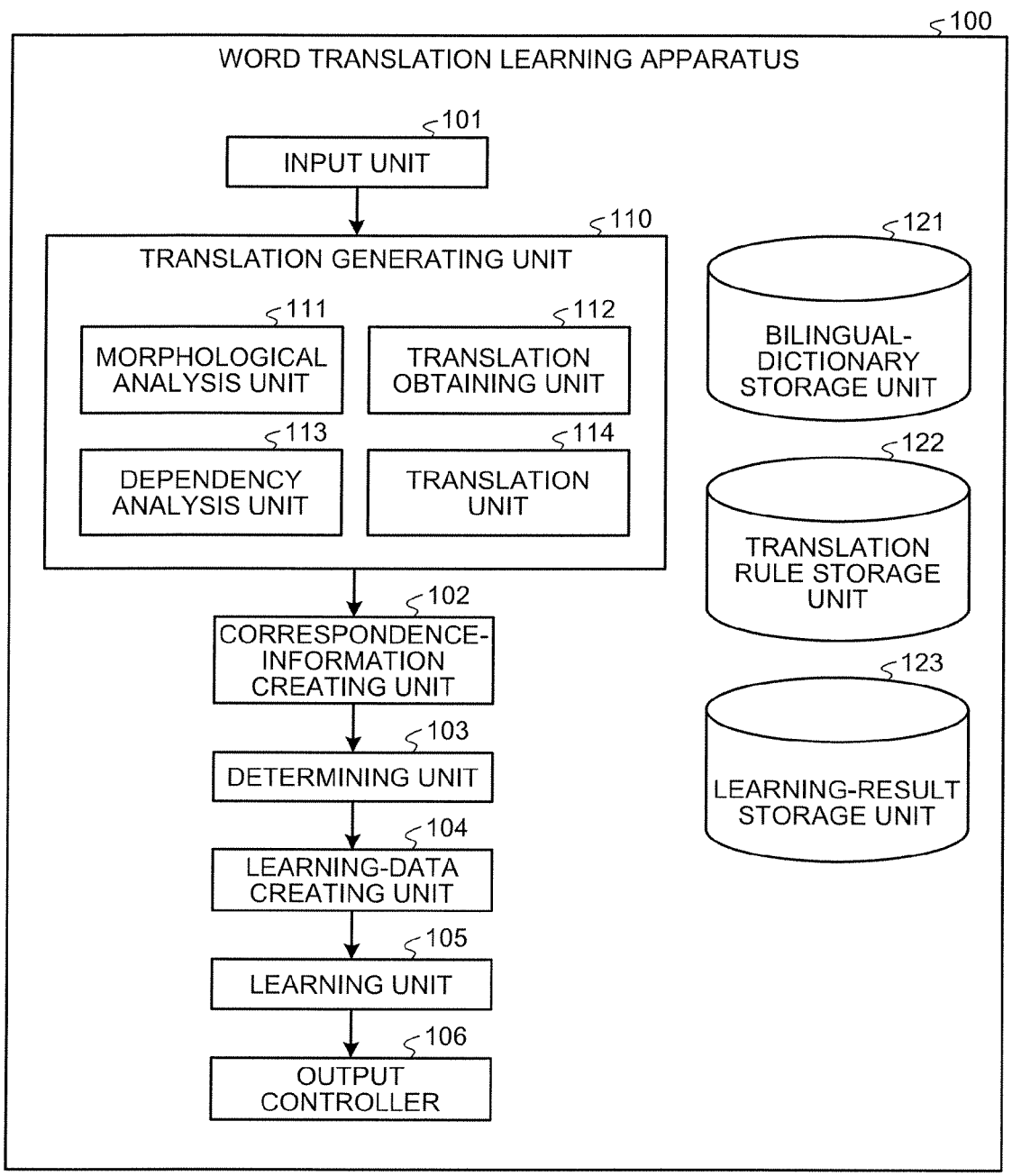
FIG. 1 is a block diagram of a configuration of a word translation learning apparatus according to an embodiment of the present invention.

As shown in FIG. 1, a word translation learning apparatus 100 includes a bilingual-dictionary storage unit 121, a translation rule storage unit 122, a learning-result storage unit 123, an input unit 101, a translation generating unit 110, a correspondence-information creating unit 102, a determining unit 103, a learning-data creating unit 104, a learning unit 105, and an output controller 106.

The bilingual-dictionary storage unit 121 stores a bilingual dictionary in which at least one translation is associated with a word in the source language. As shown in FIG. 2, the bilingual dictionary includes description of words, description of words as an original form, parts of speech, and translation list. When there is a plurality of translation candidates for one word, a plurality of translations divided by sign ";" is described in the column of translation list.

Returning to FIG. 1, the translation rule storage unit 122 stores the translation rule used at the time of translation. As shown in FIG. 3, the translation rule includes word ID for identifying a word in the translation rule, description of words, description of words as an original form, parts of speech, dependency destination ID indicating an ID of a word having a dependency relationship, and translation. The translation rule is referred to when a translation unit 114 described later selects an appropriate translation according to a dependency analysis result (syntax analysis result) from a plurality of translation candidates.

In the translation rule in FIG. 3, when a word, whose original form is "interest" and part of speech is noun, modifies a word, whose original form is "pay" and part of speech is verb, the Japanese translation of "interest" is designated as word 301 ((利息) .). Further, when the column of "description", "original form", or "parts of speech" is blank, an item other than the blank column is collated with the analysis result. When the column of "translation" is blank, any translation is not selected.

Figure 4:
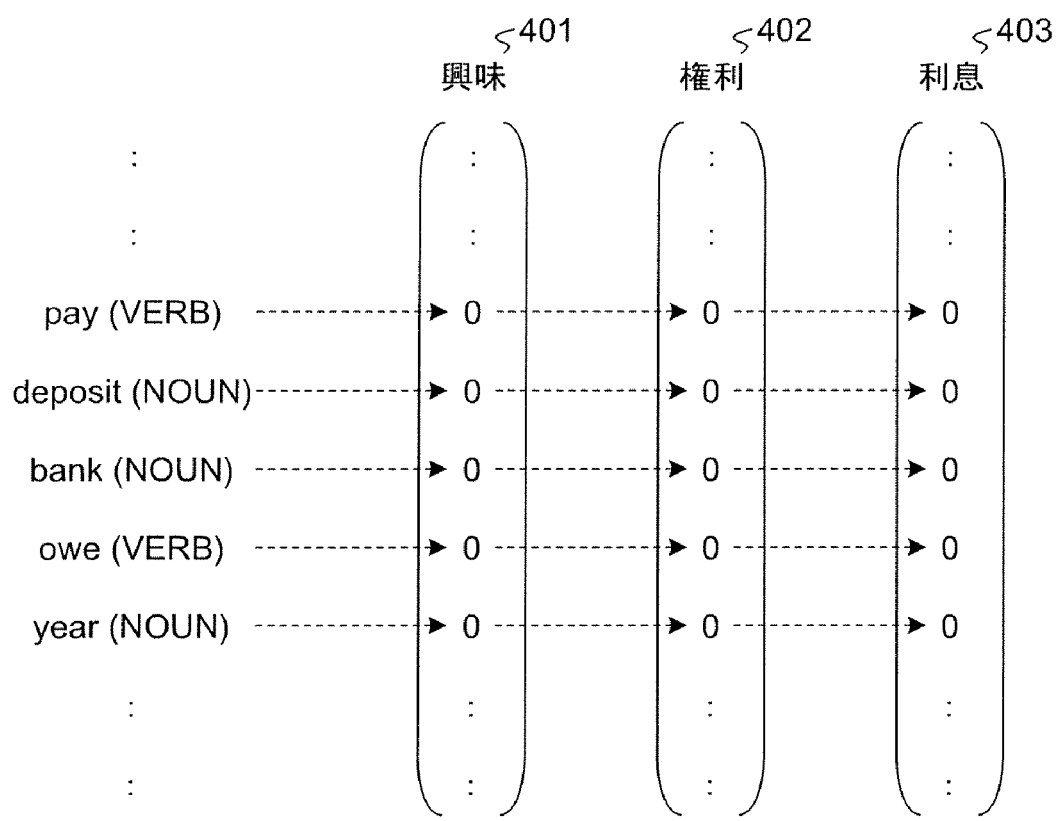
FIG. 4 is a schematic diagram for explaining an example of a data structure of a learning result.

Returning to FIG. 1, the learning-result storage unit 123 stores the learning result by the learning unit 105. As shown in FIG. 4, in the present embodiment, the learning result is expressed in a format in which frequency of the word appearing before and after the word to be learnt is vectorized. In the following explanations, the learning result in the vector format is referred to as a learning vector. The method of vectorizing the learning vector is not limited thereto, and any conventionally used methods such as a method of weighting a value by a distance from a focused word or the like.

FIG. 4 depicts the learning result with respect to word 401 ((興味) ,), word 402 ((権利) ,), and word 403 ((利息) ,), which are the Japanese translation candidates of "interest". The respective words appeared near "interest" in the word translation learning data corresponds to respective dimensions of the learning vector. The values of the respective dimensions indicate the frequency of the corresponding word. All the values of the respective dimensions of the learning vector are initially set 0.

The bilingual-dictionary storage unit 121, the translation rule storage unit 122, and the learning-result storage unit 123 can be any generally used recording medium such as a hard disk drive (HDD), an optical disk, a memory card, and a random access memory (RAM).

Returning to FIG. 1, the input unit 101 inputs a text (input text) in the source language by an input device (not shown) such as a keyboard or from a recording medium (not shown) such as a hard disk.

The translation generating unit 110 generates the translation in the target language and the likelihood expressing the probability of the translation, with respect to each word included in the input text. In the present embodiment, the translation generating unit 110 translates the input text into the target language, using the same method as machine translation in a conventionally used transfer method. The translation generating unit 110 includes a morphological analysis unit 111, a translation obtaining unit 112, a dependency analysis unit 113, and the translation unit 114.

The morphological analysis unit 111 performs morphological analysis with respect to the input text to divide the text in a unit of word. The translation obtaining unit 112 obtains the translation in the target language corresponding to each divided word from the bilingual-dictionary storage unit 121. The dependency analysis unit 113 analyzes a dependency relationship between the divided words.

The translation unit 114 obtains the appropriate translation according to the dependency relationship by applying the translation rule to a dependency analysis result. Specifically, when a plurality of translations is obtained from the bilingual-dictionary storage unit 121 as the translation with respect to the divided word, the translation unit 114 refers to the analyzed dependency relationship and the translation rule in the translation rule storage unit 122 to obtain the translation corresponding to the word as a dependency destination.

For example, when a part of the dependency analysis result obtained by the dependency analysis unit 113 matches a syntax pattern specified by the "word ID", "description", "original form", "parts of speech", and "dependency destination ID" in the translation rule as shown in FIG. 3, the translation specified in the "translation" column in the translation rule is obtained.

The translation generating unit 110 sets likelihood=1 to the translation obtained by applying the translation rule, and sets likelihood=0 to the translation obtained without applying the translation rule. The translation process and the likelihood setting method by the translation generating unit 110 are not limited thereto, and any conventionally used machine translation technique can be applied, so long as a translation of each word included in the input text can be generated and the likelihood expressing the probability of each translation can be generated.

The correspondence-information creating unit 102 creates correspondence information by combining the word in the input text with a translation generated by the translation generating unit 110 with respect to the word.

The determining unit 103 determines whether the likelihood of the translation is larger than a predetermined threshold value with respect to respective pieces of created correspondence information, thereby determining whether to adopt the correspondence information as the word translation learning data. In the present embodiment, because the likelihood takes a value of 0 or 1, for example, 0 can be used as the threshold value. The determining unit 103 then determines to adopt the correspondence information including a translation having the likelihood of 1, that is, the correspondence information including the translation obtained by applying the translation rule.

The learning-data creating unit 104 creates the word translation learning data by associating each word included in the input text with the correspondence information adopted as the word translation learning data. Details of the data structure of the word translation learning data will be described later.

The learning unit 105 performs word translation learning by using the created translated translation learning data. Specifically, the learning unit 105 learns the translation by using the learning vector stored in the learning-result storage unit 123. The word translation learning method by the learning unit 105 is not limited to the one using the learning vector, and any conventionally used method such as a method of learning the translation by using a mechanical learning machine represented by a support vector machine (SVM) can be applied.

The output controller 106 controls an output process of the word translation learning data created by the learning-data creating unit 104 or the learning result by the learning unit 105. For example, the output controller 106 outputs the learning result to the learning-result storage unit 123. The configuration can be such that the output controller 106 outputs the learning result to an output unit (not shown) such as a display unit or a printer.

Figure 5:
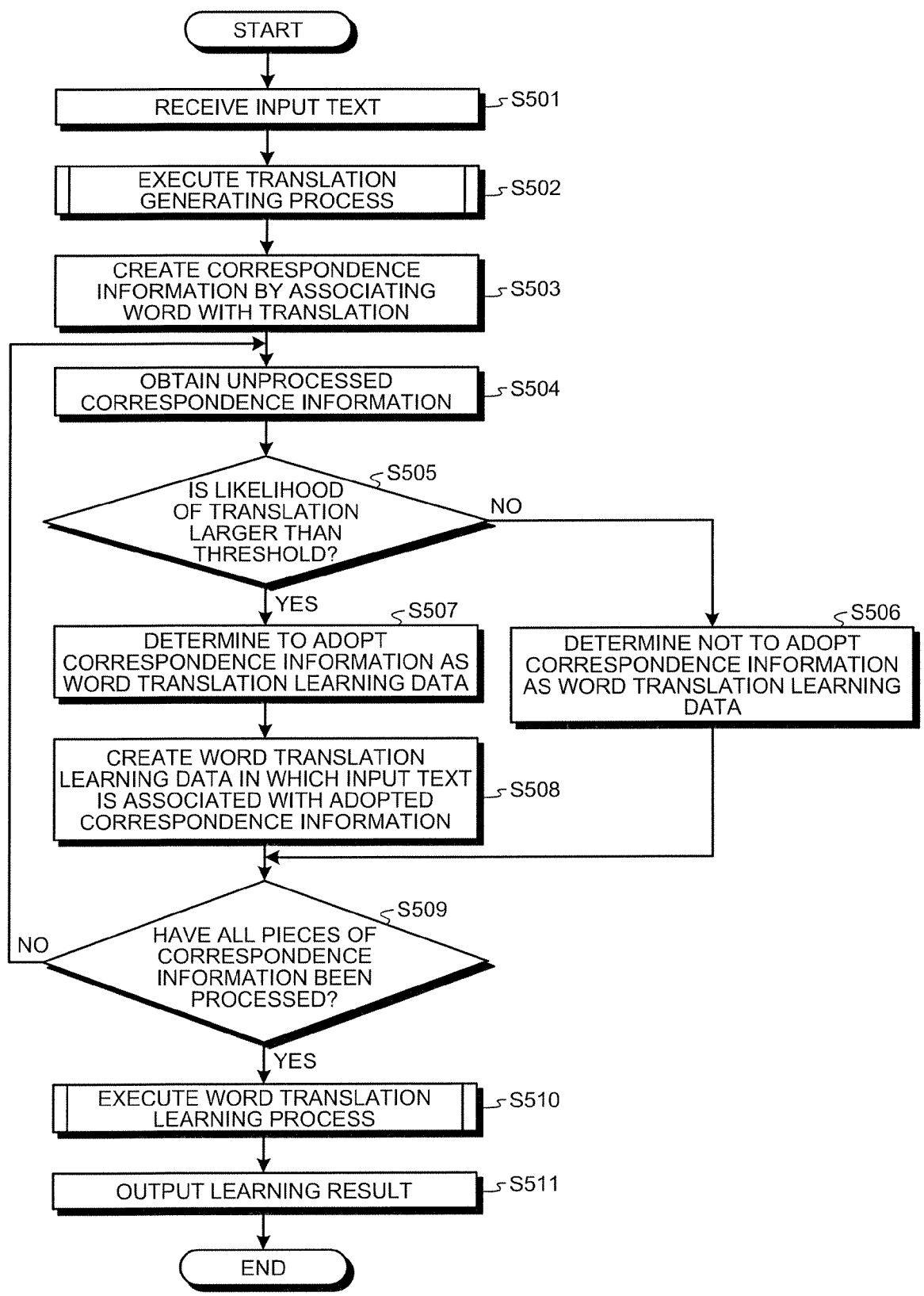
FIG. 5 is a flowchart of an overall flow of a learning data creating/learning process according to the embodiment.

A learning data creating/learning process performed by the word translation learning apparatus 100 according to the present embodiment is explained next with reference to FIG. 5. In the learning data creating/learning process, the learning data is created from the input text and translation is learnt based on the created learning data.

The input unit 101 first receives an input of the input text (step S501). The translation generating unit 110 executes a translation generating process for generating a translation with respect to the respective words in the input text (step S502). Details of the translation generating process will be explained later.

After the translation generating process, the correspondence-information creating unit 102 creates correspondence information in which each word in the input text is associated with the corresponding translation (step S503). The determining unit 103 obtains the correspondence information, of the created pieces of correspondence information, for which it has not been determined yet whether to adopt the information as the word translation learning data (step S504).

The determining unit 103 determines whether the likelihood of the translation included in the obtained correspondence information is larger than the threshold value (step S505). As described above, the likelihood takes a value of 0 or 1, and likelihood=1 is set to the translation to which the translation rule is applied. Accordingly, this step corresponds to determining whether the translation has been obtained by applying the translation rule.

When the likelihood is not larger than the threshold value, that is, when the translation has been obtained without applying the translation rule (NO at step S505), the determining unit 103 determines not to adopt the current correspondence information as the word translation learning data (step S506).

When the likelihood is larger than the threshold value, that is, when the translation has been obtained by applying the translation rule (YES at step S505), the determining unit 103 determines to adopt the current correspondence information as the word translation learning data (step S507). In this case, the learning-data creating unit 104 creates the word translation learning data in which the adopted correspondence information is associated with the input text (step S508).

The determining unit 103 then determines whether all the pieces of correspondence information have been processed (step S509). When all the pieces of correspondence information have not been processed (NO at step S509), the determining unit 103 obtains the next correspondence information to repeat the process (step S504). When all the pieces of correspondence information have been processed (YES at step S509), the learning unit 105 executes the word translation learning process based on the created word translation learning data (step S510). Details of the word translation learning process will be explained later.

After the word translation learning process, the output controller 106 outputs the result of the word translation learning process to the learning-result storage unit 123 (step S511), and finishes the learning data creating/learning process.

The translation generating process at step S502 is explained in detail with reference to FIG. 6.

The morphological analysis unit 111 performs morphological analysis with respect to the input text to divide the input text into words (step S601). The translation obtaining unit 112 obtains the translation respectively corresponding to the divided words from the bilingual dictionary in the bilingual-dictionary storage unit 121 (step S602).

FIG. 7 depicts a processing result in a case that the source language is English and the target language is Japanese, and an English input text, "pay deposit interest", is provided.

As shown in FIG. 7, the processing result includes word ID for identifying a word in the input text, description of the word in the input text, original form of the word, parts of speech, dependency destination, translation list, and flag indicating the presence of rule application. For the original form, the parts of speech, and the translation list, information obtained from the bilingual dictionary is set.

A word ID of a word having the dependency relationship with the word is set in the "dependency destination" column. Because the dependency destination is set by syntax analysis performed after the morphological analysis, the dependency destination column is blank at this stage. In the "rule application" column, 1 is set when the translation rule is applied, and 0 is set when the translation rule is not applied. That is, a value corresponding to the likelihood with respect to the respective translations is set in the "rule application" column. Because the "rule application" column is set by a process for applying the translation rule performed after the syntax analysis, "0" is set as a default value at this stage.

Returning to FIG. 6, the dependency analysis unit 113 executes the dependency analysis (syntax analysis) with respect to the divided words (step S603). Accordingly, the dependency relationship between the words is clarified.

Figures 8, 9, 10:
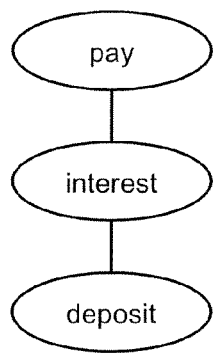
FIG. 8 is a schematic diagram for explaining an example of a processing result of dependency analysis.
FIG. 9 is a schematic diagram for visually expressing a dependency relationship.
FIG. 10 is a schematic diagram for explaining a processing result when the translation rule is applied.

As shown in FIG. 8, the word ID of the dependency destination of each word is set to the column of the "dependency destination". When there is no dependency destination, "−1" is set to the column of the "dependency destination".

FIG. 9 is a schematic diagram for visually expressing the dependency relationship in FIG. 8. FIG. 9 depicts a case that a word in a node indicated by an ellipse modifies a word in an upper node.

The translation unit 114 applies the translation rule to determine a translation with respect to a word for which a plurality of translations is included in the translation list (step S604).

FIG. 10 is a schematic diagram for explaining a processing result when the translation rule as shown in FIG. 3 is applied to the morphological analysis result shown in FIG. 8. A part in which "interest" modifies "pay" in the morphological analysis result in FIG. 8 accords with the translation rule in FIG. 3. Accordingly, word 301 ((利息).) in FIG. 3 is determined as the translation of "interest", and a value of the translation list of "interest" including three translations is changed to translation 1001 ((利息)) in FIG. 8. A value of the column of "interest" applied with the rule is changed to "0" from "1".

The correspondence-information creating unit 102 creates the correspondence information in which the description is associated with the translation in the translation list for each line of the processing result as shown in FIG. 10.

Details of the data structure of the word translation learning data are explained next. The data structure of the word translation learning data to be created is explained, for a case that the source language is English and the target language is Japanese, and an input text, "pay deposit interest" in English, is provided.

The processing result as shown in FIG. 10 is obtained by the translation generating process with respect to the input text. Subsequently, the determining unit 103 determines whether the correspondence information is adopted as the word translation learning data.

In an example in FIG. 10, because each line in the table corresponds to each piece of correspondence information, the determining unit 103 performs determination for each line. The determining unit 103 determines whether to adopt the correspondence information as the word translation learning data based on whether the translation applied with the translation rule is included. That is, the determining unit 103 adopts the correspondence information corresponding to a line, in which the value of the line of "rule application" is "1", as the word translation learning data. In the example in FIG. 10, only the correspondence information in which the word "interest" is associated with Japanese translation 1001 ((利息).) is adopted as the word translation learning data.

Figures 11, 12, 13:
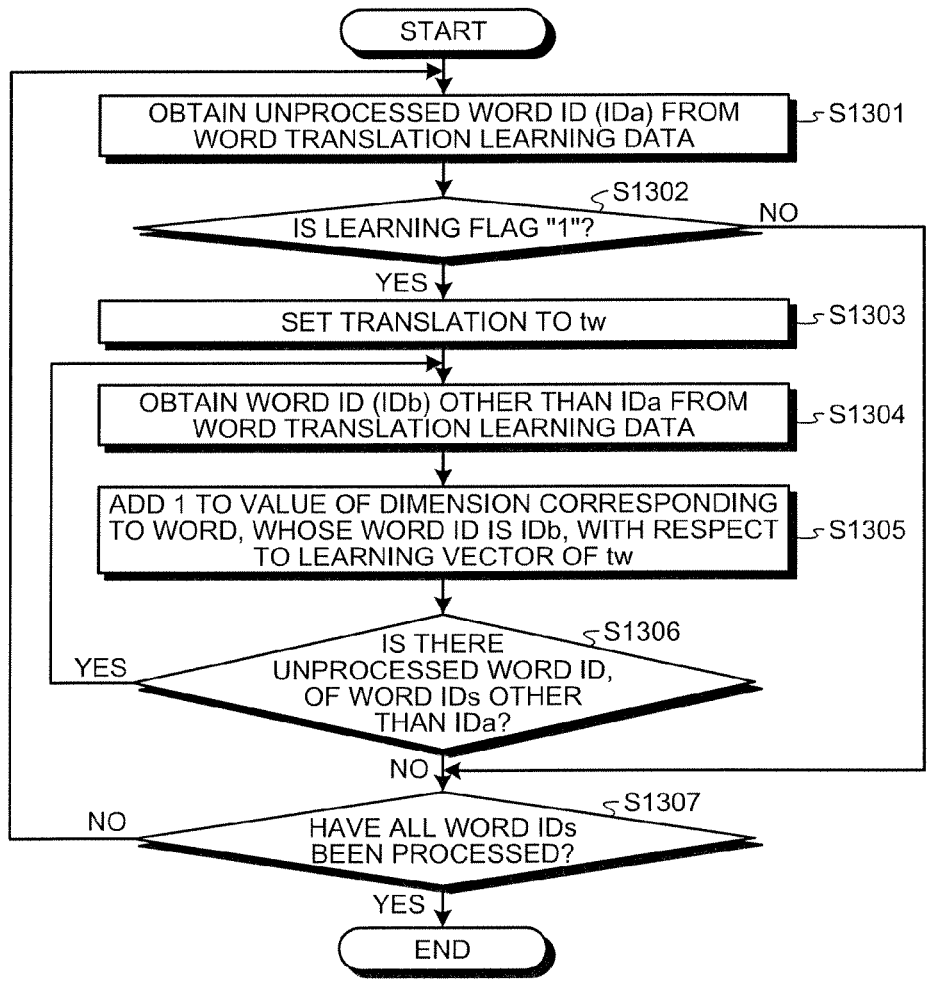
FIG. 11 is a schematic diagram for explaining an example of a determination result.
FIG. 12 is a schematic diagram for explaining an example of a data structure of word translation learning data to be created.
FIG. 13 is a flowchart of an overall flow of a word translation learning process according to the embodiment.

In FIG. 11, an example in which the determination result is expressed in a table format. As shown in FIG. 11, the determination result includes word ID, description, original form, parts of speech, translation, and learning flag indicating whether the correspondence information is adopted as the word translation learning data. A value of the processing result of the translation generating process as shown in FIG. 10 is directly set to the columns of word ID, description, and parts of speech.

The top translation in the translation list column in FIG. 10 is set as the translation. In an example in FIG. 10, there is no word, in which a plurality of translations is left in the translation list. As a result, therefore, the value of the translation list in FIG. 10 is directly set in the translation column in FIG. 11. The rule application value in FIG. 10 is directly set.

The learning-data creating unit 104 refers to the determination result shown in FIG. 11, to create the word translation learning data. As shown in FIG. 12, the learning-data creating unit 104 creates the word translation leaning data in which the translation in the adopted correspondence information is embedded in the input text as a value of "tw" attribute of a "<learn>" tag.

The data structure of the word translation learning data is not limited to the format shown in FIG. 12, and any format of data can be used, in which the combination of the word and the translation is associated with at least one word in the input text other than the word. For example, the entire determination result in the table format as shown in FIG. 11 can be used as the word translation learning data. Selection of a specific translation can be learnt by using the word translation learning data in a context expressed by the associated word.

The word translation learning data in FIG. 12 indicates that with respect to a text of "pay deposit interest", that is, in a context in which "pay" and "deposit" appear, "interest" is translated into Japanese word 1201 ((利息).).

Conventionally, the word translation learning data has been created manually; however, in the present embodiment, the word translation learning data can be obtained only by inputting a text in a source language by a user according to the above process. Accordingly, time and labor for creating the word translation learning data can be reduced considerably.

Details of the word translation learning process at step S510 are explained with reference to FIG. 13. A case that learning is performed by using the word translation learning data in the table format as shown in FIG. 11 is explained as an example.

The learning unit 105 first obtains an unprocessed word ID (hereinafter, IDa) from the created word translation learning data (step S1301). The learning unit 105 then determines whether the learning flag corresponding to the obtained IDa is "1" (step S1302). When the learning flag is "1" (YES at step S1302), the learning unit 105 sets the translation corresponding to the word with IDa to a variable tw (step S1303).

The learning unit 105 obtains a word ID other than IDa (hereinafter, IDb), in the created word translation learning data (step S1304). The learning unit 105 then adds 1 to a value of a dimension corresponding to a word, whose word ID is IDb, with respect to a learning vector of the translation set to the variable tw (step S1305).

The learning unit 105 then determines whether there is an unprocessed word ID, of word IDs other than IDa (step S1306). When there is an unprocessed word ID (YES at step S1306), the learning unit 105 obtains a next word ID as IDb and repeat the process (step S1304).

When there is no unprocessed word ID (NO at step S1306), the learning unit 105 determines whether the above process has been executed with respect to all the word IDs (step S1307).

When all the word IDs have not yet been processed (NO at step S1307), the learning unit 105 obtains the next unprocessed word ID as IDa to repeat the process (step S1301). When all the word IDs have been processed (YES at step S1307), the learning unit 105 finishes the word translation learning process.

A specific example of the word translation learning process is explained next. A case that translation is learnt by using the word translation learning data as shown in FIG. 11, when the learning result is in an initial state as shown in FIG. 4, is explained as an example.

In word "pay" having 0 as word ID and word "deposit" having 1 as word ID, the learning flags are "0" (NO at step S1302), and therefore learning of the translation is not performed. In word "interest" having 2 as word ID, the learning flag is "1" (YES at step S1302), and therefore a learning vector of corresponding translation 1101 ((利息)) is updated.

Figure 14:
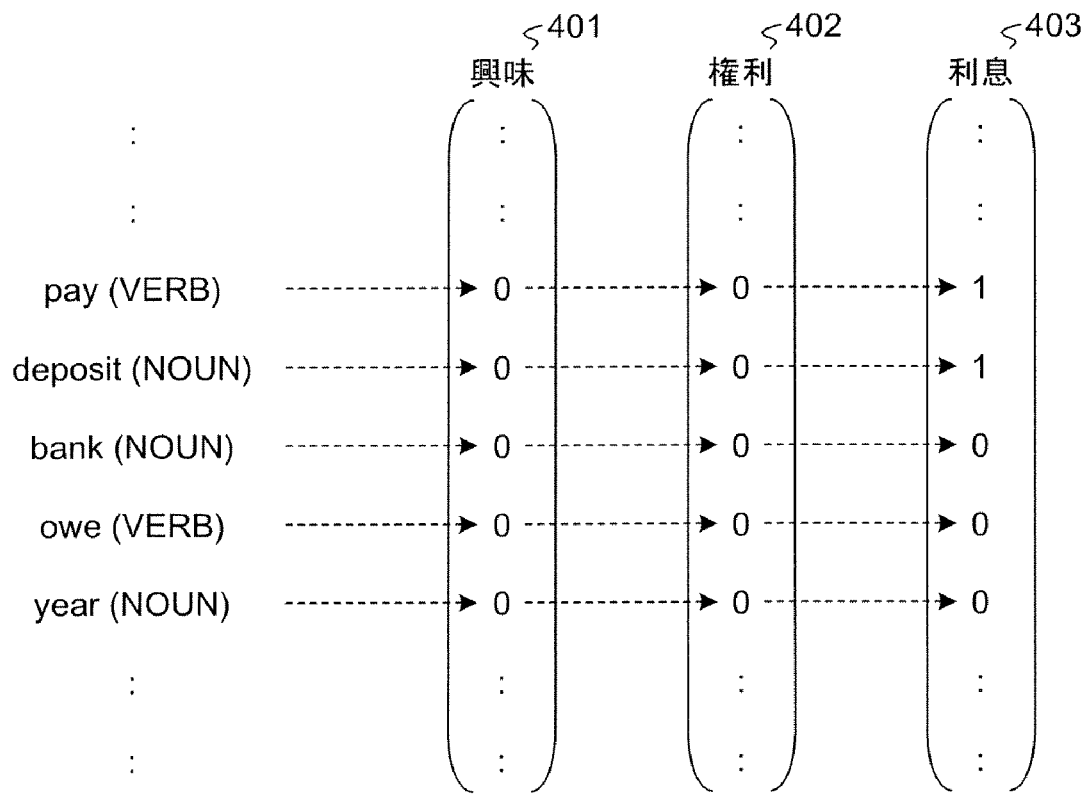
FIG. 14 is a schematic diagram for explaining an example of a learning vector.

That is, in the example in FIG. 4, the learning unit 105 updates the learning vector corresponding to word 403, which is the translation at the rightmost position. The learning unit 105 first adds one to the value of the dimension corresponding to word "pay (verb)" having 0 as word ID. Subsequently, the learning unit 105 also adds one to the value of the dimension corresponding to word "deposit (noun)" having 1 as word ID. FIG. 14 is a schematic diagram for explaining one example of the learning vector updated in this manner. As shown in FIG. 14, the values of the dimensions corresponding to the learning vector of word 403 are updated to 1.

Figure 15:
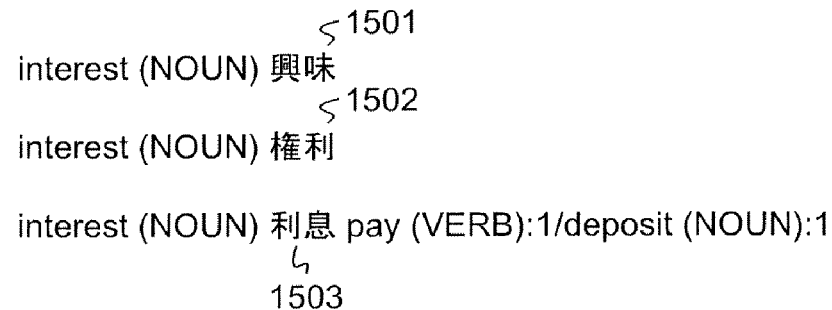
FIG. 15 is a schematic diagram for explaining an example of another data format of the learning result.

The output controller 106 can convert the learning vector to a data format available to an external device and output the data format. FIG. 15 is an example of the learning result in which the original form and the part of speech of the word corresponding to respective dimensions of the learning vector are converted to a specified format.

The learning result in FIG. 15 shows that there is no learning data, in which "interest (noun)" is translated to Japanese word 1501 ((興味)) or word 1502 ((権利) ;); however, there is the learning data in which "interest (noun)" is translated to word 1503 ((利息) ,), and that the learning data indicates that "pay (verb)" and "deposit (noun)" appear once, respectively, before and after the "interest".

The learning result in FIG. 15 can be used in the following manner to improve the quality of the machine translation. A case that an English input text "The bank owes me 10 years of deposit interest." is translated into Japanese is explained as an example.

When the input text is translated by using the bilingual dictionary as shown in FIG. 2 and the translation rule as shown in FIG. 3, the processing result as shown in FIG. 16 can be obtained. If the translation list corresponding to "interest" having 8 as word ID is observed, because the translation rule is not applied to the input text, three translation candidates ((興味, 権利, 利息)) remain.

If it is assumed that the top translation is output when there is a plurality of translation candidates, inappropriate translation ((興味)) is output with respect to "interest" in this example. In such a case, appropriate translation ((利息)) can be selected by using the learning result as shown in FIG. 15.

It is assumed here that the learning vector as shown in FIG. 14 is obtained, or when the learning result shown in FIG. 15 has been obtained, it is converted to the learning vector shown in FIG. 14.

Figure 17:
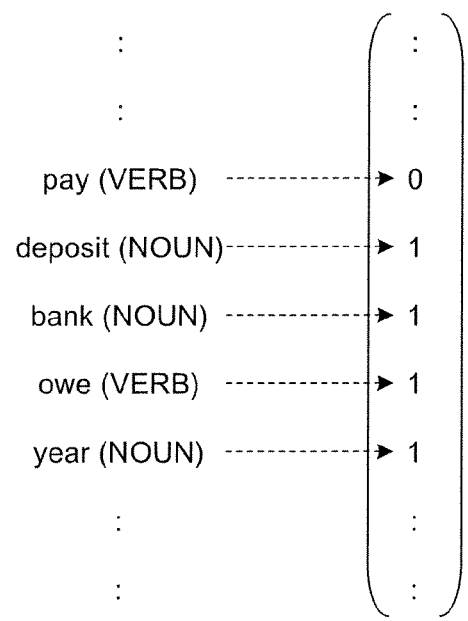
FIG. 17 is a schematic diagram for explaining an example of a vector representation.

With respect to "interest" in the input text, "The bank owes me 10 years of deposit interest.", the frequency of occurrence of words before and after is vectorized, using the same method as in the learning vector. The dimension of the vector is not allocated to articles, pronouns, prepositions, numerals, and signs. FIG. 17 is a schematic diagram for explaining one example of vector representation converted in this manner.

A translation corresponding to the learning vector having the largest cosine similarity with the vector in FIG. 17, of the three learning vectors in FIG. 14, is selected. Accordingly, because the translation having the common words before and after can be selected, more appropriate translation can be obtained.

For example, because all components of the learning vectors of word 401 ((利息) ,) and word 402 ((権利)) of the three learning vectors in FIG. 14 are 0, the cosine similarity becomes 0. On the other hand, the value of the dimension corresponding to "deposit (noun) is 1 for the learning vector of word 403 ((利息) ,), and the value of the dimension corresponding to "deposit (noun) is 1 also for the vector in FIG. 17. Accordingly, the cosine similarity takes a value larger than 0. Therefore, the learning vector having the largest cosine similarity with the vector in FIG. 17 is the learning vector corresponding to word 403 ((利息) ,). That is, word 403 ((利息)) can be selected as the translation of word "interest" in the input text "The bank owes me 10 years of deposit interest.".

Thus, in the word translation learning apparatus 100 according to the present embodiment, the word translation learning data including the translation applied with the translation rule when the input text is machine-translated and the input text can be created. Accordingly, the load for creating the word translation learning data, which has been conventionally performed manually, can be reduced. Because the word translation learning can be executed based on the word translation learning data created in this manner, the efficiency in the word translation learning process can be improved.

Figure 18:
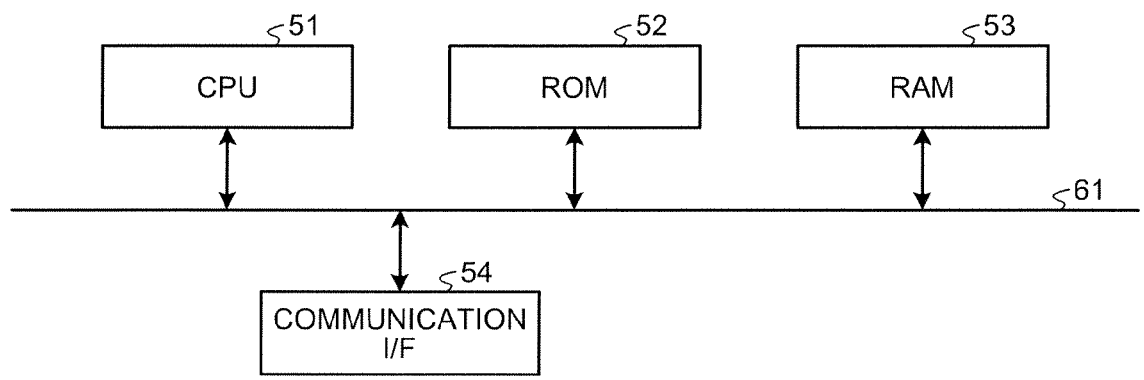
FIG. 18 is a schematic diagram for explaining a hardware configuration of the word translation learning apparatus according to the embodiment.

The hardware configuration of the word translation learning apparatus 100 according to the present embodiment is explained with reference to FIG. 18.

The word translation learning apparatus 100 according to the present embodiment includes a controller such as a central processing unit (CPU) 51, a storage unit such as a read only memory (ROM) 52 and a RAM 53, a communication I/F 54 connected to a network to perform communication, an external storage unit such as a hard disk drive (HDD) and a compact disk (CD) drive, a display unit such as a display, an input unit such as a keyboard and a mouse, and a bus 61 for connecting the respective units with each other, which is a hardware configuration using a normal computer.

A data creation program to be executed by the word translation learning apparatus 100 according to the present embodiment is recorded on a computer readable recording medium such as a compact disk read only memory (CD-ROM), a flexible disk (FD), a compact disk recordable (CD-R), and a digital versatile disk (DVD) in an installable or executable format file and provided.

The data creation program executed by the word translation learning apparatus 100 according to the present embodiment can be provided by being stored on a computer connected to a network such as the Internet and downloaded via the network. Further, the data creation program executed by the word translation learning apparatus 100 according to the embodiment can be provided or distributed via a network such as the Internet.

The data creation program according to the embodiment can be incorporated in a ROM or the like to be provided.

The data creation program executed by the word translation learning apparatus 100 according to the present embodiment has a module configuration including the respective units described above (the input unit, the translated word generating unit, the correspondence-information creating unit, the determining unit, the learning-data creating unit, the learning unit, and the output controller). As actual hardware, the CPU 51 (processor) reads out the data creation program from the recording medium, and executes the program, so that these respective units are loaded on a main memory, to generate the respective units on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data creating apparatus configured to create learning data for learning proper usage of a plurality of translation candidates corresponding to one word in a source language, the translation candidates being described in a target language, the data creating apparatus comprising:
- an input unit configured to input a sentence in the source language;
- a translation generating unit configured to translate one word in the sentence into the target language based on a predetermined translation rule, and generate a plurality of translation candidates in the target language with respect to the word and likelihood expressing probability of the translation candidate;
- a correspondence-information creating unit configured to create a plurality of correspondence information, each correspondence information including the word and one of the translation candidates;
- a determining unit configured to determine whether the likelihood of the translation candidate is larger than a predetermined threshold value;
- a learning-data creating unit configured to create the learning data in which another word in the sentence is added to the correspondence information of the translation candidate having the likelihood larger than the threshold value;
- a dictionary storage unit configured to store a bilingual dictionary in which a word in the source language and the translation candidate with respect to the word in the source language are associated with each other; and
- a translation rule storage unit configured to store the translation rule in which the word in the source language, a word having a dependency relationship with the word in the source language, and the translation candidate are associated with each other, wherein
the data creating apparatus further comprises a processor for executing at least the correspondence-information creating unit, and wherein
the translation generating unit includes:
- a morphological analysis unit configured to perform morphological analysis with respect to the sentence to divide the sentence into words;
- a translation obtaining unit configured to obtain the translation candidate with respect to the divided word from the dictionary storage unit;
- a dependency analysis unit configured to analyze the dependency relationship between the divided words; and
- a translation unit configured to collate the divided word and a word having the dependency relationship with the divided word, with the word in the source language and the word having the dependency relationship with the word in the source language, respectively, in the translation rule stored in the translation rule storage unit for each divided word, and obtain a matched translation candidate associated with the word in the source language in the translation rule from the translation rule storage unit.

2. The apparatus according to claim 1, wherein the translation generating unit generates the likelihood larger than that of the translation candidate obtained from the dictionary storage unit, with respect to the translation candidate obtained from the translation rule storage unit.

3. The apparatus according to claim 1, wherein the learning-data creating unit creates the learning data in which a word included in the sentence is associated with the correspondence information including the translation candidate obtained from the translation rule storage unit.

4. The apparatus according to claim 1, wherein the learning-data creating unit creates the learning data in which a word other than the word included in the correspondence information, within the words included in the sentence, is associated with the correspondence information including the translation candidate having the likelihood larger than the threshold value.

5. The apparatus according to claim 1, wherein the learning-data creating unit creates the learning data in which the translation candidate in the correspondence information is associated with a word in the correspondence information including the word included in the sentence and the translation candidate having the likelihood larger than the threshold value, within the words included in the sentence.

6. The apparatus according to claim 1, further comprising a learning unit configured to learn proper usage of the translation candidates based on the learning data.

7. A data creating method performed in a data creating apparatus that creates learning data for learning proper usage of a plurality of translation candidates corresponding to one word in a source language, the translation candidates being described in a target language, the method comprising:
- inputting a sentence in the source language;
- translating one word in the sentence into a target language based on a predetermined translation rule, and generating a plurality of translation candidates in the target language with respect to the word and likelihood expressing probability of the translation candidate;
- creating, using a processor, a plurality of pieces of correspondence information, each correspondence information including the word and one of the translation candidates;
- determining whether the likelihood of the translation candidate is larger than a predetermined threshold value; and
- creating the learning data in which another word in the sentence is added to the correspondence information of the translation candidate having the likelihood larger than the threshold value, wherein the translating includes:
- performing morphological analysis with respect to the sentence to divide the sentence into words;
- obtaining the translation candidate with respect to the divided word from a dictionary storage unit that stores a bilingual dictionary in which a word in the source language and the translation candidate with respect to the word in the source language are associated with each other;
- analyzing a dependency relationship between the divided words:
- collating the divided word and a word having the dependency relationship with the divided word, with the word in the source language and the word having the dependency relationship with the word in the source language, respectively, in the translation rule stored in a translation rule storage unit for each divided word, the translation rule storage unit storing the translation rule in which the word in the source language, the word having the dependency relationship with the word in the source language, and the translation candidate are associated with each other; and obtaining a matched translation candidate associated with the word in the source language in the translation rule from the translation rule storage unit.

8. A non-transitory computer readable medium including programmed instructions for creating learning data for learning proper usage of a plurality of translation candidates corresponding to one word in a source language, the translation candidates being described in a target language, wherein the instructions, when executed by a computer, cause the computer to perform:

inputting a sentence in the source language;

translating one word in the sentence into a target language based on a predetermined translation rule, and generating a plurality of translation candidates in the target language with respect to the word and likelihood expressing probability of the translation candidate;

creating a plurality of pieces of correspondence information, each correspondence information including the word and one of the translation candidates;

determining whether the likelihood of the translation candidate is larger than a predetermined threshold value; and creating the learning data in which another word in the sentence is added to the correspondence information of the translation candidate having the likelihood larger than the threshold value, wherein the translating includes:

performing morphological analysis with respect to the sentence to divide the sentence into words;

obtaining the translation candidate with respect to the divided word from a dictionary storage unit that stores a bilingual dictionary in which a word in the source language and the translation candidate with respect to the word in the source language are associated with each other;

analyzing a dependency relationship between the divided words;

collating the divided word and a word having the dependency relationship with the divided word, with the word in the source language and the word having the dependency relationship with the word in the source language, respectively, in the translation rule stored in a translation rule storage unit for each divided word, the translation rule storage unit storing the translation rule in which the word in the source language, the word having the dependency relationship with the word in the source language, and the translation candidate are associated with each other; and obtaining a matched translation candidate associated with the word in the source language in the translation rule from the translation rule storage unit.

\* \* \* \* \*